United States Patent

[11] 3,571,618

[72] Inventors Henry F. Inacker
Philadelphia, Pa.;
Miles C. Johnson, Mount Holly, N.J.
[21] Appl. No. 746,955
[22] Filed July 23, 1968
[45] Patented Mar. 23, 1971
[73] Assignee The United States of America as represented by the Secretary of the Navy

[54] VIDEO LOGARITHMIC AMPLIFIER
3 Claims, 2 Drawing Figs.

[52] U.S. Cl. .......... 307/229, 307/230, 328/145
[51] Int. Cl. .......... G06g 7/24
[50] Field of Search .......... 328/145; 307/229, 230

[56] References Cited
UNITED STATES PATENTS
3,128,377 4/1964 Goddard .......... 328/145
OTHER REFERENCES
A CIRCUIT WITH LOGARITHMIC TRANSFER RESPONSE OVER 9 DECADES by Gibbonst Horn IEE TRANSACTIONS Vol. CT-11 No. 3 Sept. 1964 pages 378—384

*Primary Examiner*—Donald D. Forrer
*Assistant Examiner*—Harold A. Dixson
*Attorneys*—Harry A. Herbert, Jr. and Julian L Siegel

ABSTRACT: A logarithmic amplifier having a feedback transistor in which the amplifier's input is resistively connected to a DC amplifier and is biased with a power supply resistively connecting the output of the DC amplifier by a pair of diodes and connecting the input by a diode and resistor.

PATENTED MAR 23 1971 3,571,618

INVENTORS
HENRY F. MACKER
MILES C. JOHNSON
BY Harry A. Herbert Jr and
Julian L. Siegel
ATTORNEYS

VIDEO LOGARITHMIC AMPLIFIER

BACKGROUND OF THE INVENTION

This invention relates to operational amplifier circuits and more particularly to video logarithmic amplifiers.

A video logarithmic amplifier is a device that has an output proportional to the logarithm of the input voltage and it is desirable to have the logarithmic accuracy better than 0.1 db. over a 45 db. dynamic range and a video bandwidth greater than 3 MHz.

In the past, logarithmic amplifiers using DC amplifiers and silicon planar feedback transistors have had disadvantages, the most severe being bandwidth or pulse response in the logarithmic stage. A severe distortion is caused to low level pulses since the bandwidth of the amplifier has been very poor under open loop conditions. The effect can be so severe that narrow pulses would be completely lost.

SUMMARY OF THE INVENTION

The present invention is an operational logarithmic amplifier with a transistor feedback circuit and a novel biasing scheme. The biasing circuit is comprised of resistors and diodes that enable the logarithmic amplifier to provide a wide bandwidth by causing the amplifier to be clamped just below the threshold of the feedback transistor. As the input increases in amplitude the bias current is diverted from the summing point to the amplifier by the action of the amplifier itself.

It is an object of the invention to provide a novel video logarithmic amplifier.

It is another object to provide a video amplifier having a wide bandwidth.

It is still another object to provide an operational amplifier that amplifies narrow pulses and avoids distortion to low level pulses.

These and other advantages, features and objects of the invention will become more apparent from the following description taken in connection with the illustrative embodiment in the accompanying drawing, wherein:

DESCRIPTION OF THE PREFERRED EMBODIMENT

Figure 1:
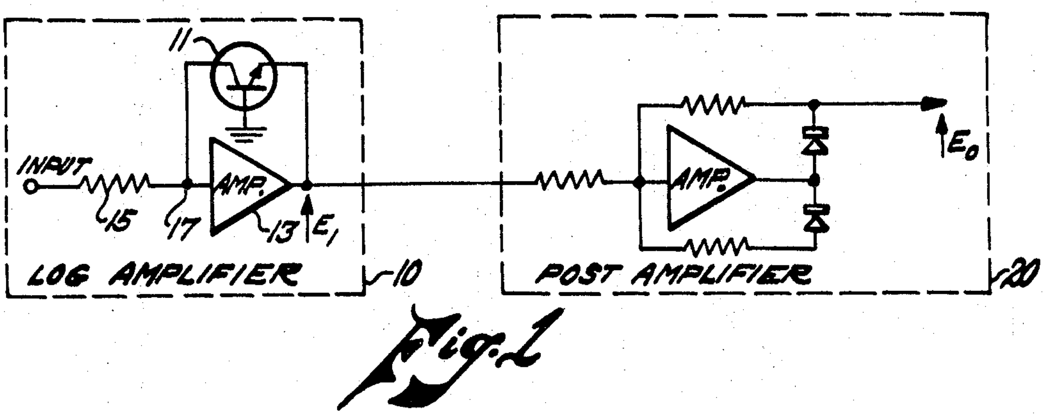
FIG. 1 is a schematic diagram of the prior art.

The basic principle of logarithmic amplifier 10 as shown in FIG. 1 is the logarithmic relationship between the base-emitter voltage and the collector current for transistor 11, such as a silicon planar type, operated with a base-collector voltage of zero. When transistor 11 is used as a feedback element around high-gain DC amplifier 13, the output is approximately 60 mv. (2.3 $kt/q$) for a decade change input current. The input voltage is converted to a current by resistor 15 and the virtual ground which exists at summing point 17 of DC amplifier 13. The signal at $E_1$ is approximately 135 mv. for a 45 db. change in input voltage. This signal is amplified by post amplifier 20 to the desired output level $E_o$. For the specific design shown, the input voltage was 0 to +5 volts and the logarithmic output was 0 to +4 volts.

The circuit thus described offers problems in the bandwidth or pulse response in the logarithmic stage. The problem arises from the fact that feedback transistor 11 has an inherent base-emitter voltage threshold in the order of 0.5 volts. Thus a pulse signal at the input to the logarithmic stage of approximately 28 mv. (−45 db. from 5 v.) must cause the output of the logarithmic stage to move approximately 0.5 v. before the logarithmic action of feedback transistor 11 becomes effective. Further, the amplifier must do this under essentially open loop conditions since feedback transistor 11 is still in the very high impedance range. This effect causes severe distortion to low level pulses since the bandwidth of the amplifier is very poor under open loop conditions and the effect is so severe that narrow pulses are completely lost.

Figure 2:
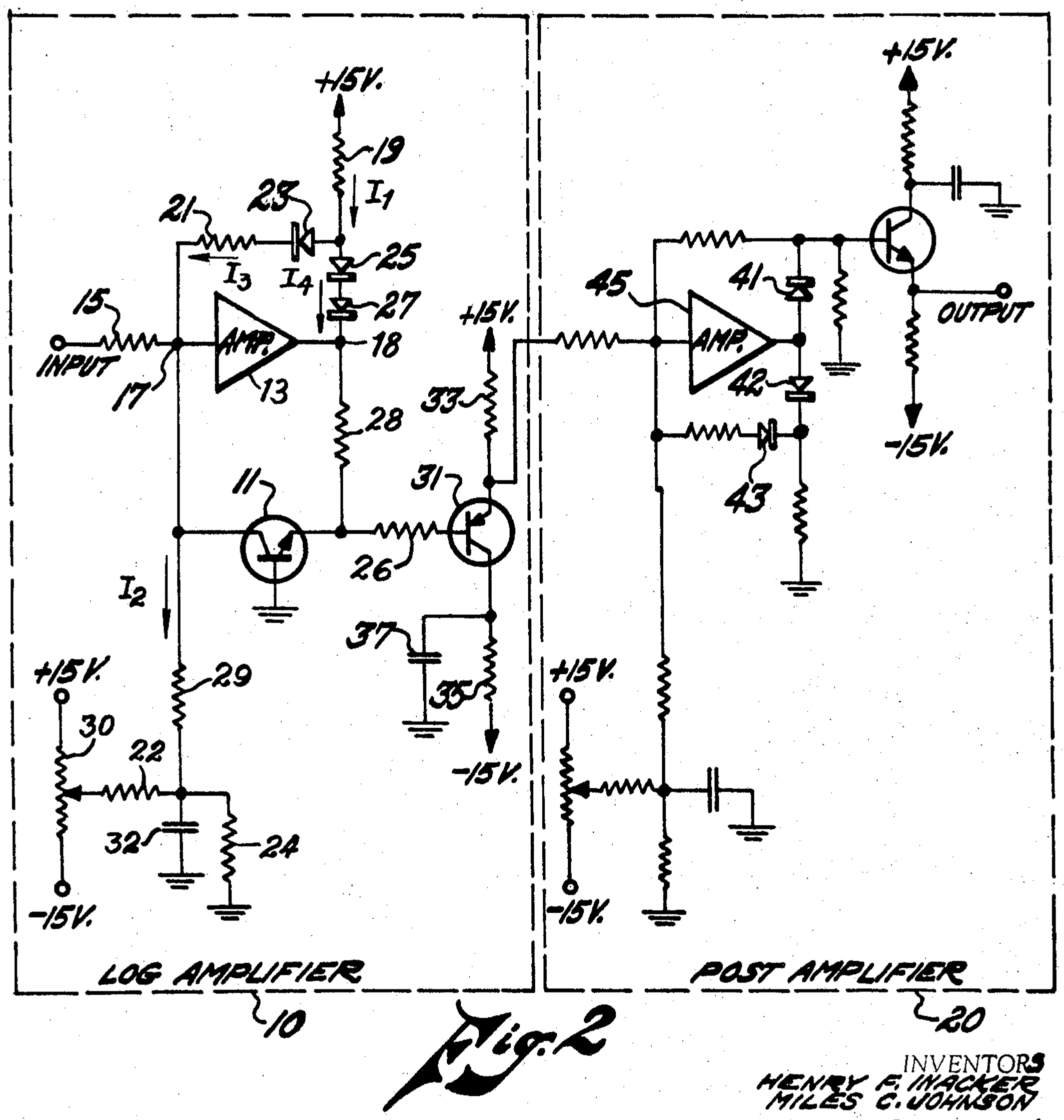
FIG. 2 is a schematic diagram showing an embodiment of the invention.

The present invention overcomes the above-mentioned problems as shown in FIG. 2, which uses a bias scheme consisting of resistor 19 connected to a supply voltage and the series connection of diode 23 and resistor 21 connected to the input of DC amplifier 13 at summing point 17. Resistor 19 also connects to the output of DC amplifier 13 via series diodes 25 and 27. During the time when no signal is present at the input of the logarithmic amplifier or the level is below −45 db., a bias current is supplied to summing point 17. This current causes the output of the logarithmic amplifier to be set just below the threshold of feedback transistor 11. As the input signal increases in amplitude the bias current is diverted from summing point 17 to the amplifier by the action of the amplifier itself. This biasing technique reduces the signal swing at −45 db. to about 50 mv. at the amplifier output. The signal is then fed to the emitter-follower circuit comprising transistor 31, resistors 33 and 35, and capacitor 37.

Amplifier 13 is a high-gain inverting DC amplifier. Such an amplifier when used with a feedback network connected from the amplifier's output to input has the capability of diverting any current flowing from an external source toward the amplifier input terminal to the amplifier's output by way of the feedback network. This action causes amplifier input terminal 17 to exhibit the well-known "virtual ground" characteristic. Bias current $I_1$ is shown flowing through resistor 19 which divides into currents $I_3$ and $I_4$. The current of primary interest is $I_3$ which is flowing through resistor 21 and diode 23 toward the amplifier input terminal 17. When static bias $I_2$ established by the circuit connected to terminal 17 consisting of elements 22, 24, 29, 30, 32 is properly adjusted, $I_3$ will flow through transistor 11 and resistor 28 to the amplifiers output 18. This adjustment is performed when the input signal is at 0 volts and compensates for the nonideal amplifier static characteristics commonly referred to as input offset current.

The current $I_3$ flowing through transistor 11 and resistor 28 establishes the amplifier output level at approximately −450 mv. due to the base-emitter drop of transistor 11 and $I_3$ flowing through resistor 28. As the voltage at the input terminal increases from 0 volts toward +5 volts, the total current at amplifier input terminal 17 increases. This increased current flows through transistor 11 and resistor 28 causing the amplifier output terminal 18 to become more negative than −450 mv. As terminal 18 becomes more negative, current $I_4$ increases and $I_3$ decreases due to the inverting amplifier action of amplifier 13 and diodes 23, 25, and 27. The circuit constants are chosen such that the current $I_3$ is reduced to essentially zero when the input has reached the −45 db. minumum level of interest as previously mentioned and the total bias current $I_1$ is diverted to amplifier output terminal 18. For input levels above this minimum, diode 23 is essentially opened and the log amplifier action is essentially the same as that of FIG. 1. Resistor 28 serves to limit the loop gain of the amplifier at high input levels to prevent instability due to the nonideal frequency response characteristics of amplifier 13.

Resistor 26 performs a similar function for the emitter follower circuit comprising transistor 31, resistors 33 and 35, and capacitor 37.

The post amplifier is also a nonlinear feedback amplifier. Diodes 41, 42 and 43 act to switch the gain of amplifier 45 when the amplifier output passes through 0 volts. The bias level on the input to the post amplifier is adjusted so the output of the post amplifier is zero for a −45 db. pulse at the input to the logarithmic amplifier and full scale (approximately 4 v.) for a 0 db. input pulse.

Although the invention has been described with reference to a particular embodiment, it will be understood to those skilled in the art that the invention is capable of a variety of alternative embodiments within the spirit and scope of the appended claims.

We claim:

1. A video logarithmic amplifier comprising a logarithmic amplifier and a post amplifier wherein the logarithmic amplifier comprises:

a. A DC amplifier having an input and output;

b. an input resistor connected to the input of the DC amplifier;

c. a biasing voltage source;

d. a second resistor connected to the biasing voltage source;

e. a first diode interposed between the second resistor and the output terminals of the DC amplifier with a polarity to provide easy current flow from the second resistor to the DC amplifier output;

f. a third resistor and a second diode in series interposed between the second resistor and the input of the DC amplifier, the second diode having a polarity to provide easy current flow from the second resistor to the input of the DC amplifier; and g. a transistor having a collector and emitter, the collector being connected to the input of the DC amplifier and the emitter being connected to the output of the DC amplifier.

2. A video logarithmic amplifier according to claim 1 which further comprises an emitter-follower transistor circuit connected to the output of the DC amplifier.

3. A video logarithmic amplifier according to claim 2 which further comprises a nonlinear feedback post amplifier circuit fed by the emitter-follower transistor circuit.